(12) United States Patent
Galiana Domínguez

(10) Patent No.: US 10,487,913 B2
(45) Date of Patent: Nov. 26, 2019

(54) ADJUSTABLE FLYWHEEL

(71) Applicant: Evaristo Galiana Domínguez, Concentaina (ES)

(72) Inventor: Evaristo Galiana Domínguez, Concentaina (ES)

( * ) Notice: Subject to any disclaimer, the term of this patent is extended or adjusted under 35 U.S.C. 154(b) by 0 days.

(21) Appl. No.: 15/778,024

(22) PCT Filed: Nov. 17, 2016

(86) PCT No.: PCT/ES2016/070819
§ 371 (c)(1),
(2) Date: Nov. 5, 2018

(87) PCT Pub. No.: WO2017/089636
PCT Pub. Date: Jun. 1, 2017

(65) Prior Publication Data
US 2019/0063550 A1    Feb. 28, 2019

(30) Foreign Application Priority Data

Nov. 26, 2015 (ES) .................................. 201500873

(51) Int. Cl.
*F16F 15/31* (2006.01)
*H01F 7/02* (2006.01)
*H01F 7/06* (2006.01)
*H02N 11/00* (2006.01)
*H02K 7/09* (2006.01)

(52) U.S. Cl.
CPC ................ *F16F 15/31* (2013.01); *H01F 7/02* (2013.01); *H01F 7/06* (2013.01); *H02K 7/09* (2013.01); *H02N 11/00* (2013.01)

(58) Field of Classification Search
CPC ......... F16F 15/31; F16F 2222/06; H01F 7/02; H01F 7/06
See application file for complete search history.

(56) References Cited

U.S. PATENT DOCUMENTS

| 3,970,409 A | 7/1976 | Luchuk |
| 5,085,088 A | 2/1992 | Robinson et al. |
| 5,269,197 A | 12/1993 | Yang |

(Continued)

FOREIGN PATENT DOCUMENTS

| CN | 201588906 U | 9/2010 |
| CN | 202061314 U | 12/2011 |

(Continued)

OTHER PUBLICATIONS

International Search Report dated Mar. 3, 2017 of corresponding International Application No. PCT/ES2016/070819; 9 pgs.

*Primary Examiner* — Vicky A Johnson
(74) *Attorney, Agent, or Firm* — Maier & Maier, PLLC

(57) ABSTRACT

The flywheel has the ability to vary its behaviour without having to resort to making adjustments when the unit is idle, due to which its inertia movement can be adjusted at the discretion of the technician based on the angular velocity of the system or the possible variations of the flywheel load. The flywheel has the ability to vary the distribution of its point masses due to the influence of at least one magnetic or electromagnetic field that can be modified when in operation. Aimed for the industrial sector dedicated to the construction of machinery.

4 Claims, 2 Drawing Sheets

(56) References Cited

U.S. PATENT DOCUMENTS

Figure 1:
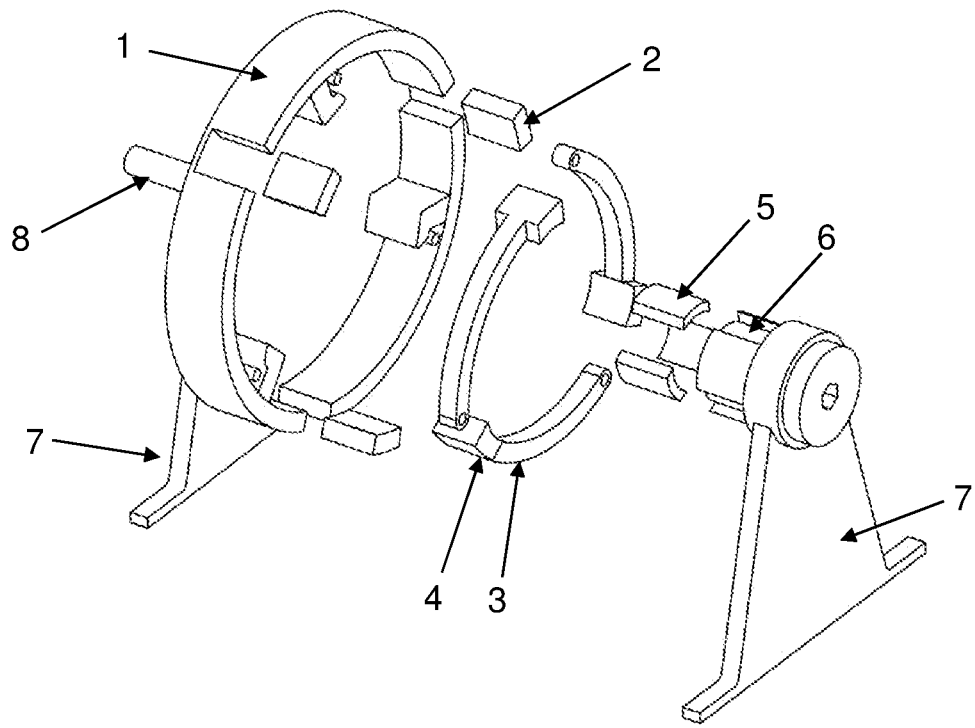

| | | | | |
|---|---|---|---|---|
| 6,719,107 B1* | 4/2004 | Chen | .......................... | H02P 3/04 |
| | | | | 188/164 |
| 7,451,859 B2* | 11/2008 | Yin | .................... | A63B 21/0051 |
| | | | | 188/161 |
| 7,911,096 B2* | 3/2011 | Froelich | ................. | H02K 53/00 |
| | | | | 310/80 |
| 9,124,154 B2* | 9/2015 | Hochberg | ............ | H02K 7/1876 |
| 2006/0201762 A1* | 9/2006 | Lai | .................... | A63B 21/0051 |
| | | | | 188/267 |
| 2007/0210659 A1* | 9/2007 | Long | ...................... | H02K 49/10 |
| | | | | 310/80 |
| 2008/0111432 A1* | 5/2008 | Froelich | ................. | H02K 53/00 |
| | | | | 310/37 |
| 2009/0033162 A1 | 2/2009 | Dugas | | |

FOREIGN PATENT DOCUMENTS

| | | | |
|---|---|---|---|
| CN | 103470688 | A | 12/2013 |
| CN | 103812388 | A | 5/2014 |
| CN | 203825938 | U | 9/2014 |
| DE | 102013001944 | A1 | 8/2014 |
| FR | 2431788 | A1 | 2/1980 |
| FR | 2490766 | A1 | 3/1982 |
| JP | 559-93547 | A | 5/1984 |
| KR | 10-0252257 | B1 | 5/2000 |
| RU | 2265761 | C1 | 12/2005 |
| SU | 1171619 | A1 | 8/1985 |
| SU | 1744331 | A1 | 6/1992 |

* cited by examiner

ADJUSTABLE FLYWHEEL

FIELD

The purpose of this invention is to provide flywheels with the ability to adapt their behaviour to a variety of fluctuations in the input power they receive and the load without having to stop the flywheel to do so.

This invention is located within the industrial sector, especially in the industries engaged in the construction of machinery.

BACKGROUND

The contribution flywheels make to mechanics is widely known, given that the moment of inertia is dependent on the differential mass with respect to its rotation axis. The state of the art has followed two types of strategy, on the one hand those innovations based on modifying the turn radius of the assembly and others based on modifying this mass. Taking account of this natural classification, attention has also been paid to the innovations that allow for this adjustment to be carried out or not when the flywheel is in operation.

Patent CN103470688A shows a flywheel with the ability to mount different point masses when idle, patent JPS5993547A comprises different interior spaces that can be filled with different density fluids or patent CN203825938U, whose specific masses are arranged on guides for their adjustment. All of these require that the flywheel be idle and therefore they differ from the one object of this document. On the other hand, there are different documents that include solutions based on changes to the intrinsic parameters for operating the flywheel, more specifically of its angular velocity, exclusively using the displacement of point masses by effect of the centrifugal forces generated through the operation of the flywheel, such as CN201588906U, whose masses ascend along guides due to these forces, thus increasing the moment of inertia. Document U.S. Pat. No. 5,085,088A provides a solution similar to the previous one by using specific masses in the form of balls connected to the flywheel by a joint in a similar way to the centrifugal governor by James Watt. In parallel to this type of settings there are others in which the masses must overcome the gravitational forces in addition to other elastic forces, such as the previously mentioned U.S. Pat. No. 5,085,088U or U.S. Pat. No. 5,269,197A.

The state of the art also includes examples in which the masses are not specific, but are distributed across a set of small particles or fluids are used for this function. A sample of these patents would be the French patent FR2431788A1, U.S. Pat. No. 3,970,409 or SU1744331A1.

Another recurrent possibility would be the use of different chambers that contain fluids connected through a set of valves that enable to change the position of these masses, as can be seen in US2009033162A1.

There are also known means for modifying the behaviour of the flywheels by using clutches or transmission elements such as gears, as seen in KR100252257B1 or FR2490766A1.

SU1171619A or RU2265761C1 are examples of means for varying the characteristics of the flywheel by using ferromagnetic fluids.

There are no known means that allow to adjust the properties of the flywheel such as the recommended one.

SUMMARY

This adjustable flywheel has means that allow to adjust the characteristics of its moment of inertia without requiring it to be idle, thus obtaining an operation which can be adapted by the technician depending on the angular input speed of the flywheel or different loading conditions coupled to the same. These means are materialised by having at least two magnetic point masses housed in at least two mass-bearing arms which can rotate with regards to the rotation point located closest to the maximum diameter of the flywheel chassis, in such a way that the centrifugal force generated causes the rotation of the arms and the masses, increasing the moment of inertia of the assembly as these point masses are moved with respect to the rotation point. The chassis of the flywheel is fitted with conventional means for limiting the movement of the mass-bearing arms, such as some stops that limit the movement.

The adjustment that is carried out on the flywheel is done so by means of the attraction or repulsion generated on these point masses; on the one hand by at least two permanent magnets inserted in the flywheel chassis itself close to its maximum diameter and whose faces concentric to the drive shaft coincide with their reciprocal ones on the magnetic mass-bearing arms, generating the corresponding forces of attraction or repulsion depending on their orientation. On the other hand, the adjustable flywheel has the means for positioning at least two magnets in a magnet-holding element located concentrically to its drive shaft in such a way that these magnets remain facing the reciprocal faces of the magnetic point masses, the attraction or repulsion of these opposing facing will occur in response to the positioning of their polarities. This magnet-holding element has conventional means for moving lengthwise in the direction of the axis of the flywheel and/or on a rotating basis, for which it will use conventional means such as a system of runners or threading of this element with respect of a mounting bracket, thus altering the magnetic interaction of the point masses. Versions have been planned in which the described magnetic fields are generated by electromagnets instead of permanent magnets, in these cases the described adjustable flywheel will be fitted with the pertinent conventional switching, control and power supply means. Versions have been planned in which the point masses are made of ferromagnetic material and are not magnetic.

BRIEF DESCRIPTION

For better understanding the description contained in this report, it is accompanied by some drawings which, by way of example, represent a list of the figures of the proposed invention.

Figure 2:
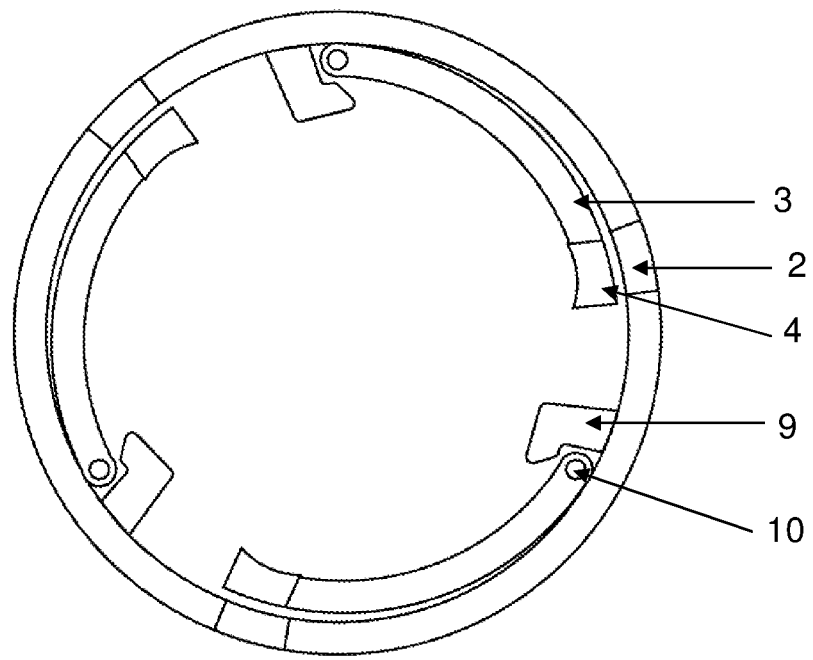

FIG. 1, shows an explosion in an isometric view of the adjustable flywheel where the following can be seen:
1. Flywheel chassis
2. Permanent magnets of the chassis
3. Mass-bearing arm
4. Magnet point mass of the arm (3)
5. Adjustment magnets
6. Sliding magnet-holder
7. Support
8. Drive shaft FIG. 2, top view of the flywheel chassis providing a view of the chassis magnets (2), the mass-bearing arms (3), the magnetic point masses (4) of the arm, the stops (9) of the mass-bearing arms, as well as the rotation point (10) of the mass-bearing arms. This figure also allows to see that the magnetic masses subject to the arm bearing them, are close to the maximum permitted rotation position and facing the magnets of the flywheel chassis.

Figure 3:
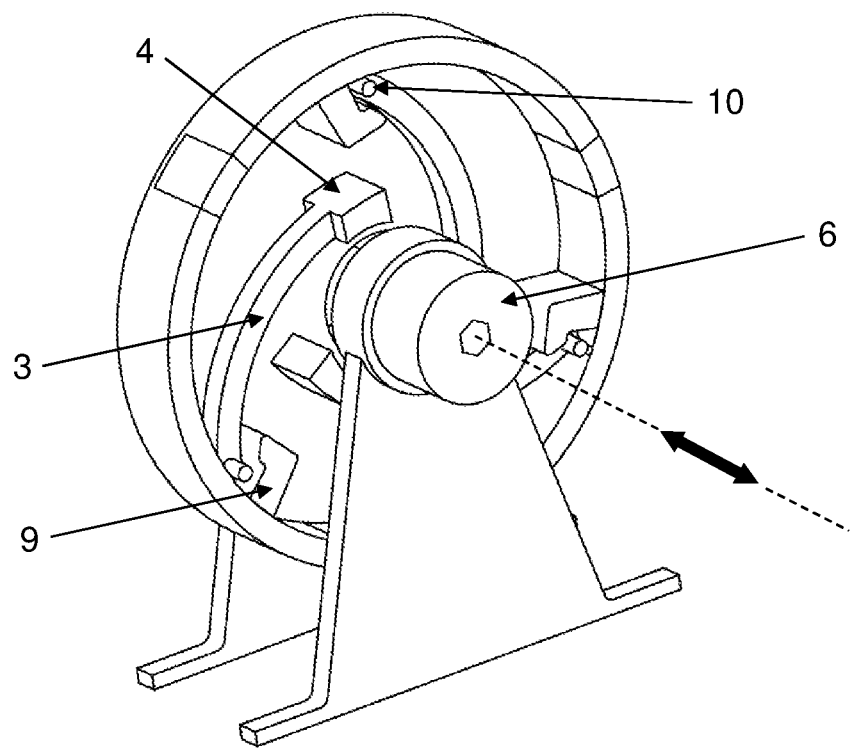

FIG. 3 shows an isometric view of the adjustable flywheel, referencing the mass-bearing arms (3) and their corresponding magnetic point masses (4) close to the centre of rotation of the flywheel, noting that this position is limited by the contact of the arms with the stops (9) of the mass-bearing arms. Also noting the rotation point (10) of the mass-bearing arms and the sliding magnet-holder (6) located in its farthest point from the flywheel chassis.

Figure 4:
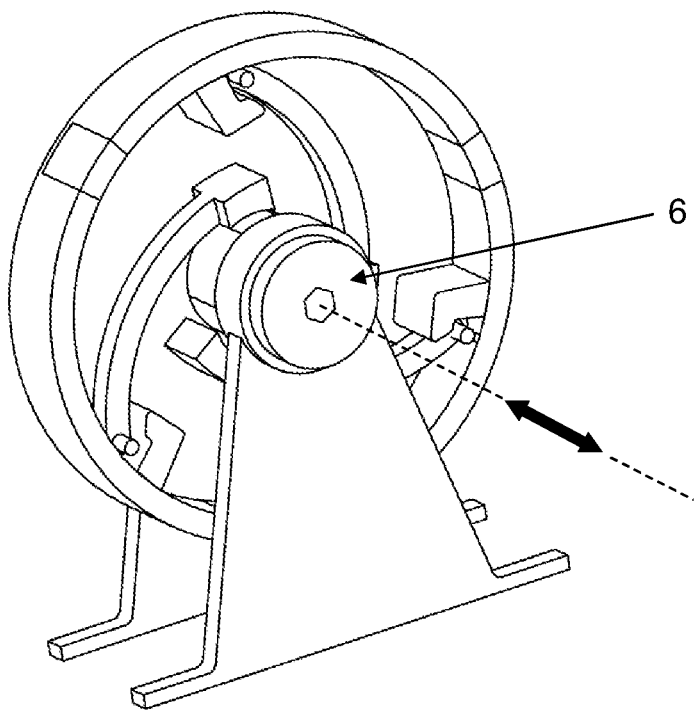

The isometric view in FIG. 4 shows the sliding magnet-holder (6) close to the flywheel chassis and close to the magnetic masses of the arm.

DETAILED DESCRIPTION

Citing, by way of example, a preferred implementation mode, in which the materials used for manufacturing the adjustable flywheel are independent of the purpose of the invention, as are the application methods and all the accessories that may be presented, provided they do not affect its essential nature.

Proposing a preferred form of realisation of the invention that has a chassis (1) of the flywheel, which houses at least two permanent magnets (2) located close to the largest diameter of the same and facing at least two magnetic point masses (4) housed in their respective mass-bearing arms (3). These mass-bearing arms are permitted relative rotation with respect to the chassis at the rotation point (10), preferably located at a point near the largest diameter of the flywheel chassis, in such a way that under the action of the centrifugal force these point masses, will move closer to the permanent magnets of the chassis.

The attraction or repulsion force between the magnetic point masses and the permanent magnets of the chassis will depend on the orientation of the poles of this pair. The flywheel has the means to limit the travel of the mass-bearing arms through conventional means such as a stop (9) which interferes with its movement. It has means to attract and repel the described magnetic point masses, by means of a sliding magnet-holder (6) concentric to the drive shaft (8) of the flywheel and independent of the same which houses at least two complementary adjustment magnets (5). The sliding magnet-holder (6) is allowed to move lengthwise and/or rotate with regard to the axis through conventional means such as a threaded system or by means of runners and will preferably be housed within a conventional support element (7). The attraction or repulsion between the opposing faces of the magnetic point masses and these magnets will similarly depend on the polarity selected in the assembly.

The invention claimed is:

1. An adjustable flywheel comprising:
at least two point masses whose faces concentric to a drive shaft are magnetic, the at least two point masses are housed at the end of at least two mass-bearing arms which are allowed relative rotation movement with respect to a rotation point, this rotation point is proximate a largest diameter of the flywheel chassis, which in turn limits the movement of the arm by use of a sliding stop; a flywheel chassis houses at least two permanent magnets positioned proximate the point masses housed in the arms when these are at their closest point to a largest diameter of the flywheel chassis; the polarity of the opposing faces, permanent magnet of the chassis and magnetic mass of the arm, may be of both attractive and repulsive nature based on the operating needs of the flywheel; the flywheel further comprising at least two adjustment magnets housed in a sliding magnet-holder concentric to the flywheel chassis and allowed to move lengthwise in a direction of the drive shaft and/or its relative movement of the driveshaft on a rotating basis, thus varying the influence of a magnetic field with regard to the magnetic point masses.

2. The adjustable flywheel according to claim 1, further comprising generating the magnetic field of the chassis through at least two electromagnets, whose location is proximate the magnetized point masses housed in the arms when they are at their closest point to the chassis, providing conventional means for electrical supply and switching.

3. The adjustable flywheel according to claim 2, further comprising point masses made with a ferromagnetic material and not being magnetized, using for its regulation only the forces of attraction of the electromagnetic fields of the rest of the electromagnets of the adjustable inertia flywheel.

4. The adjustable flywheel according to claim 1, wherein the point masses are made using ferromagnetic material and are not magnetic, which are adjusted using only the attraction forces of the magnetic or electromagnetic fields of the rest of the magnets or electromagnets of the adjustable flywheel.

* * * * *